(12) United States Patent
Ren et al.

(10) Patent No.: US 11,830,480 B2
(45) Date of Patent: Nov. 28, 2023

(54) SYSTEMS AND METHODS FOR ACCELERATING AUTOMATIC SPEECH RECOGNITION BASED ON COMPRESSION AND DECOMPRESSION

(71) Applicant: KWAI INC., Palo Alto, CA (US)

(72) Inventors: Yongxiong Ren, San Jose, CA (US); Yang Liu, San Jose, CA (US); Heng Liu, Tucson, AZ (US); Lingzhi Liu, San Jose, CA (US)

(73) Assignee: KWAI INC., Palo Alto, CA (US)

( * ) Notice: Subject to any disclaimer, the term of this patent is extended or adjusted under 35 U.S.C. 154(b) by 193 days.

(21) Appl. No.: 17/178,146

(22) Filed: Feb. 17, 2021

(65) Prior Publication Data
US 2022/0262349 A1    Aug. 18, 2022

(51) Int. Cl.
*G10L 15/16* (2006.01)
*G06N 3/02* (2006.01)
*G10L 19/04* (2013.01)
*G10L 25/30* (2013.01)

(52) U.S. Cl.
CPC .............. *G10L 15/16* (2013.01); *G06N 3/02* (2013.01); *G10L 19/04* (2013.01); *G10L 25/30* (2013.01)

(58) Field of Classification Search
CPC ................................. G10L 15/16; G10L 19/04
See application file for complete search history.

(56) References Cited

U.S. PATENT DOCUMENTS

| | | | |
|---|---|---|---|
| 11,170,776 B1 * | 11/2021 | Whalin | G10L 15/30 |
| 2013/0226850 A1 * | 8/2013 | Hannuksela | G06F 16/58 |
| | | | 706/14 |
| 2018/0350351 A1 * | 12/2018 | Kopys | G06N 3/0445 |
| 2020/0152180 A1 * | 5/2020 | Lee | G06F 40/284 |
| 2021/0050016 A1 * | 2/2021 | Kim | G10L 19/09 |
| 2021/0256386 A1 * | 8/2021 | Wieman | G06N 3/0454 |

OTHER PUBLICATIONS

Vaswani, Ashish et al., "Attention Is All You Need" Computation and Language (cs.CL); Machine Learning (cs.LG), arXiv: 1706.03762, https://doi.org/10.48550/arXiv.1706.03762, (15p).
Zhao, Yuanyuan, et al. "The Speechtransformer for Large-Scale Mandarin Chinese Speech Recognition", IEEE Xplore, Nov. 4, 2020, (5p).
Gulati, Anmol, et al., "Conformer: Convolution-augmented Transformer for Speech Recognition", Google Inc., May 16, 2020, (5p).
Chang, Feng-Ju et al., "Context-Aware Transformer Transducer for Speech Recognition", Amazon Alexa, Nov. 5, 2021, (8p).
NVIDIA DeepLearningExamples, (22p).

* cited by examiner

*Primary Examiner* — Paras D Shah
(74) *Attorney, Agent, or Firm* — Arch & Lake LLP

(57) ABSTRACT

Systems and methods are provided for automatic speech recognition. In the method, the system obtains a padded sequence by processing a plurality of acoustic signals. The system compresses the padded sequence by reducing the size of the padded sequence to obtain a compressed sequence. The system inputs the compressed sequence into a pre-trained encoder neural network to obtain an encoded sequence and then decompresses the encoded sequence by recovering the encoded sequence to an original sequential ordering. The system inputs the encoded sequence to a decoding module to obtain recognition texts.

19 Claims, 8 Drawing Sheets

SYSTEMS AND METHODS FOR ACCELERATING AUTOMATIC SPEECH RECOGNITION BASED ON COMPRESSION AND DECOMPRESSION

FIELD

The present application generally relates to automatic speech recognition, and in particular but not limited to, systems and methods for accelerating automatic speech recognition based on compression and decompression.

BACKGROUND

Automatic speech recognition (ASR) which allows the derivation of the transcription (word sequence) of an utterance given the speech waveform, has found its importance in many service applications, such as voice transcription, audio search, content review, and live streaming. ASR may use an attention-mechanism based encoder-decoder architecture, such as transformer or conformer model, which predicts word sequence by capturing long-term dependencies and wide-range context information. It can outperform the previously de facto ASR choice, i.e., recurrent neural networks that can model the temporal dependencies in the audio sequence effectively.

While the encoder-decoder architecture with the attention-mechanism based ASR approaches have achieved excellent word/character error rate performance, they generally require significant amount of time and computation resources to process every audio corpus. Thus, it is desired to efficiently accelerate such ASR approaches on heterogeneous computing platforms.

SUMMARY

In general, this disclosure describes examples of techniques relating to accelerating encoder-decoder architecture with attention-mechanism based ASR approaches.

According to a first aspect of the present disclosure, there is provided an ASR method. The ASR method includes obtaining a padded sequence by processing a plurality of acoustic signals. The ASR method further includes compressing the padded sequence by reducing the size of the padded sequence to obtain a compressed sequence. The ASR method further includes inputting the compressed sequence into a pre-trained encoder neural network to obtain an encoded sequence. The ASR method further includes decompressing the encoded sequence by recovering the encoded sequence to an original sequential ordering. The ASR method further includes inputting the encoded sequence to a decoding module to obtain recognition texts.

According to a second aspect of the present disclosure, there is provided an ASR system. The ASR system includes at least one computer storage memory operable to store data along with computer-executable instructions. The ASR system further includes at least one processor operable to read the data and operate the computer-executable instructions to obtain a padded sequence by processing a plurality of acoustic signals. The at least one processor further operable to compress the padded sequence by reducing the size of the padded sequence to obtain a compressed sequence. The at least one processor further operable to input the compressed sequence into a pre-trained encoder neural network to obtain an encoded sequence. The at least one processor further operable to decompress the encoded sequence by recovering the encoded sequence to an original sequential ordering. The at least one processor further operable to input the encoded sequence to a decoding module to obtain recognition texts.

According to a third aspect of the present disclosure, there is provided a non-transitory computer readable medium having stored thereon a program for performing a method of automatic speech recognition. The method includes obtaining a padded sequence by processing a plurality of acoustic signals. The method further includes compressing the padded sequence by reducing the size of the padded sequence to obtain a compressed sequence. The method further includes inputting the compressed sequence into a pre-trained encoder neural network to obtain an encoded sequence. The method further includes decompressing the encoded sequence by recovering the encoded sequence to an original sequential ordering. The method further includes inputting the encoded sequence to a decoding module to obtain recognition texts.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1:
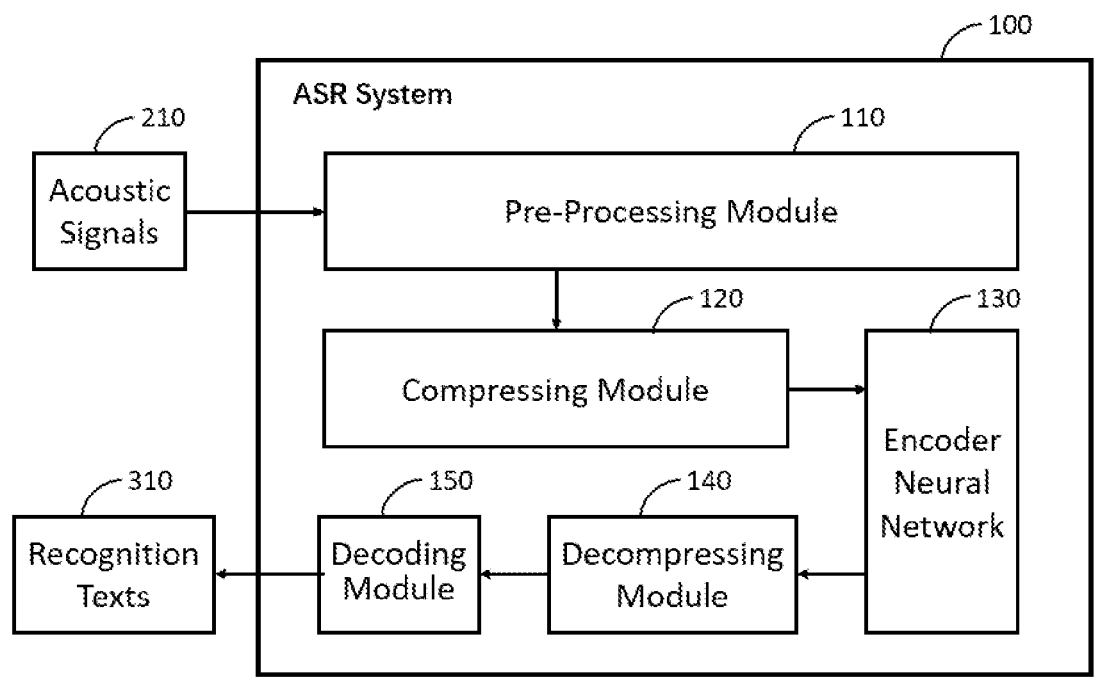
FIG. 1 is a block diagram illustrating an exemplary automatic speech recognition system in accordance with some embodiments of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," and etc. are all used as nomenclature only for references to relevant elements, e.g. devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may include steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a block diagram illustrating an exemplary automatic speech recognition (ASR) system in accordance with some embodiments of the present disclosure. As shown in FIG. 1, ASR system 100 may comprise a pre-processing module 110, a compressing module 120, an encoder neural network 130, a decompressing module 140, and a decoding module 150. The ASR system 100 may obtain a plurality of acoustic signals 210 and then performs speech recognition through the pre-trained encoder neural network 130 and the decoding module 150 to obtain the corresponding recognition texts 310. Further, the ASR system 100 may use compressing module 120 together with the decompressing module 140 for accelerating the ASR process as described further below.

The pre-processing module 110 may obtain the plurality of acoustic signals 210 and may pre-process the acoustic signals 210 prior to sending the acoustic signals 210 to the encoder neural network 130. For example, the pre-processing module 110 may pad (i.e. add) zero frames to each sequence within the plurality of acoustic signals 210 and then combine (e.g. concatenate) such sequences into a padded sequence.

To reduce execution time and memory consumption, the padded sequence may be compressed through the compressing module 120 before entering the encoder neural network 130. For example, the compressing module 120 may reduce the size of the padded sequence to obtain a compressed sequence such that the encoder neural network 130 can use such compressed sequence for encoding.

As shown in FIG. 1, the ASR system 100 may then input the compressed sequence into the encoder neural network 130 to obtain an encoded sequence. For example, the encoder neural network 130 may be a recurrent/convolutional neural network and may map the compressed sequence into the encoded sequence. That is, each calculation of the encoder neural network 130 may be regressive, such as consuming the previously generated outputs as additional input when generating the next.

After that, outputs of the encoder neural network 130 (i.e. the encoded sequence) may be sent to the decompressing module 140 before entering the decoding module 150. For example, the decompressing module 140 may recover the encoded sequence to an original sequential ordering (i.e. an ordering appeared in the padded sequence).

The ASR system 100 may then input the encoded sequence into the decoding module 150 to complete the ASR process and obtain corresponding recognition texts. In some embodiments, the decoding module 150 may include a pre-trained decoder neural network and a beam search process. For example, the decoder neural network may be a recurrent/convolutional neural network and may perform processes of input embedding, multi-head self-attention, multi-head cross attention, feed forward, output embedding, and softmax operations. The decoding module 150 may generate the recognition texts through the decoder neural network and the beam search process. Each calculation of the decoder neural network may be regressive, such as consuming the previously generated outputs as additional input when generating the next.

Figure 2:
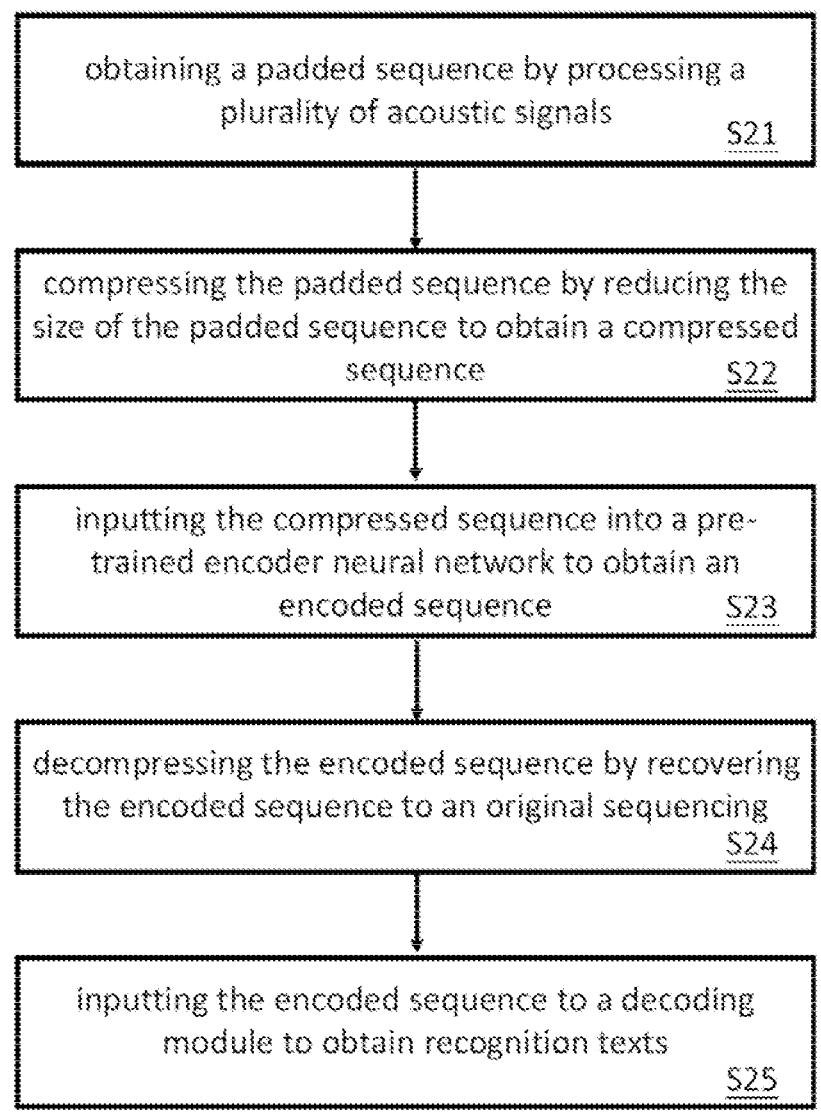
FIG. 2 is a flowchart illustrating some exemplary method steps for implementing automatic speech recognition in accordance with some embodiments of the present disclosure.

FIG. 2 is a flowchart illustrating some exemplary method steps for implementing automatic speech recognition in accordance with some embodiments of the present disclosure.

As shown in FIG. 2, step S21 includes obtaining a padded sequence by processing a plurality of acoustic signals. For example, after receiving the plurality of acoustic signals, the ASR system may pad zero frames to each sequence within the plurality of acoustic signals and then combine these sequences into the padded sequence.

Step S22 includes compressing the padded sequence by reducing the size of the padded sequence to obtain a compressed sequence.

Step S23 includes inputting the compressed sequence into a pre-trained encoder neural network to obtain an encoded sequence. For example, within the encoder neural network, the processor may perform the processes of input embedding, multi-head attention, and feed forward to generate the encoded sequence for further decoding.

Step S24 includes decompressing the encoded sequence by recovering the encoded sequence to an original sequencing (i.e. an ordering appeared in the padded sequence).

Step S25 includes inputting the encoded sequence to a decoding module to obtain recognition texts. For example, within the decoding module, the processor may perform a pre-trained decoder neural network and a beam search process to generate corresponding recognition texts. The decoder neural network may include processes of input embedding, multi-head self-attention, multi-head cross attention, feed forward, output embedding, and softmax operations.

Figure 3:
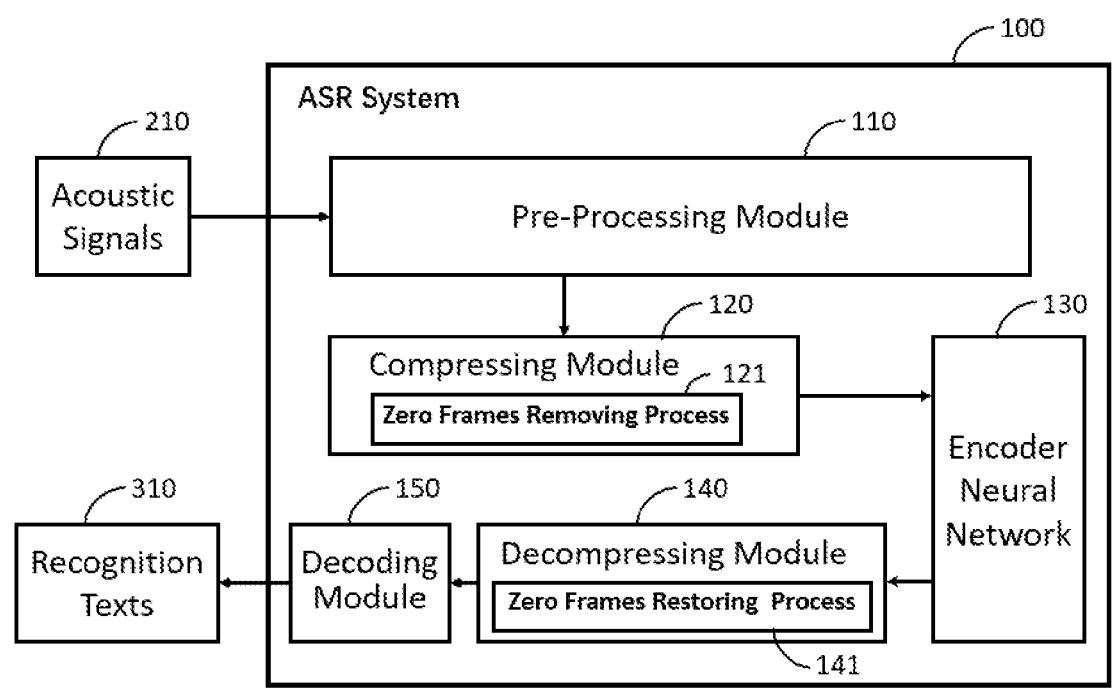
FIG. 3 is a block diagram illustrating an exemplary automatic speech recognition system that includes performing zero frames removing and restoring processes, according to some embodiments of the present disclosure.

FIG. 3 is a block diagram illustrating an exemplary automatic speech recognition system that includes performing zero frames removing and restoring processes, according to some embodiments of the present disclosure.

As shown in FIG. 3, the pre-processing module 110 may pre-process (e.g. padding and combining) the received acoustic signals 210 to generate the padded sequence. After that, the compressing module 120 may compress the padded sequence by performing a zero-frames-removing process 121 that removes previously padded (i.e. added) zero frames from the padded sequence such that the size of the padded sequence can be reduced. The compressing module 120 may then generate the compressed sequence that is sent to the encoder neural network 130 for encoding.

The encoder neural network 130 may map the compressed sequence into the encoded sequence that is send to the decompressing module 140 for further decompressing. The decompressing module 140 may then decompress the encoded sequence by performing a zero-frames-restoring process 141 that restores the removed zero frames, which are previously removed during the zero-frames-removing process 121 within the compressing module 120, to the encoded sequence such that the encoded sequence can be recovered to an original sequential ordering (i.e. an ordering appeared in the padded sequence).

The decoding module 150 may receive the encoded sequence, which has been decompressed by the zero-frames-restoring process 141, to generate the recognition texts 310.

Figure 4:
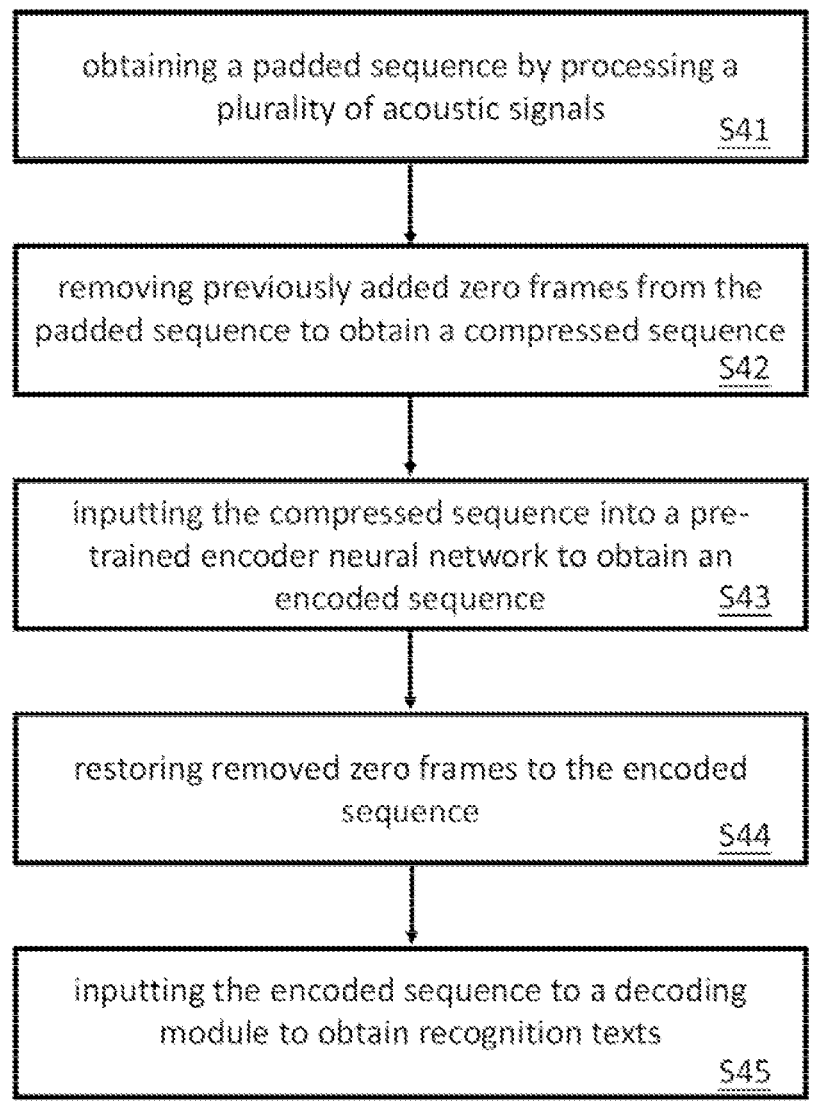
FIG. 4 is a flowchart illustrating some exemplary method steps for implementing automatic speech recognition that includes zero frames removing and restoring steps, according to some embodiments of the present disclosure

FIG. 4 is a flowchart illustrating some exemplary method steps for implementing automatic speech recognition that includes zero frames removing and restoring steps, according to some embodiments of the present disclosure.

As shown in FIG. 4, step 41 includes obtaining a padded sequence by processing a plurality of acoustic signals. Next, step 42 includes removing previously added zero frames from the padded sequence to obtain a compressed sequence. Further, step 43 includes inputting the compressed sequence into a pre-trained encoder neural network to obtain an encoded sequence. Further, step 44 includes restoring removed zero frames to the encoded sequence. Further, step 45 includes inputting the encoded sequence to a decoding module to obtain recognition texts.

Figure 5:
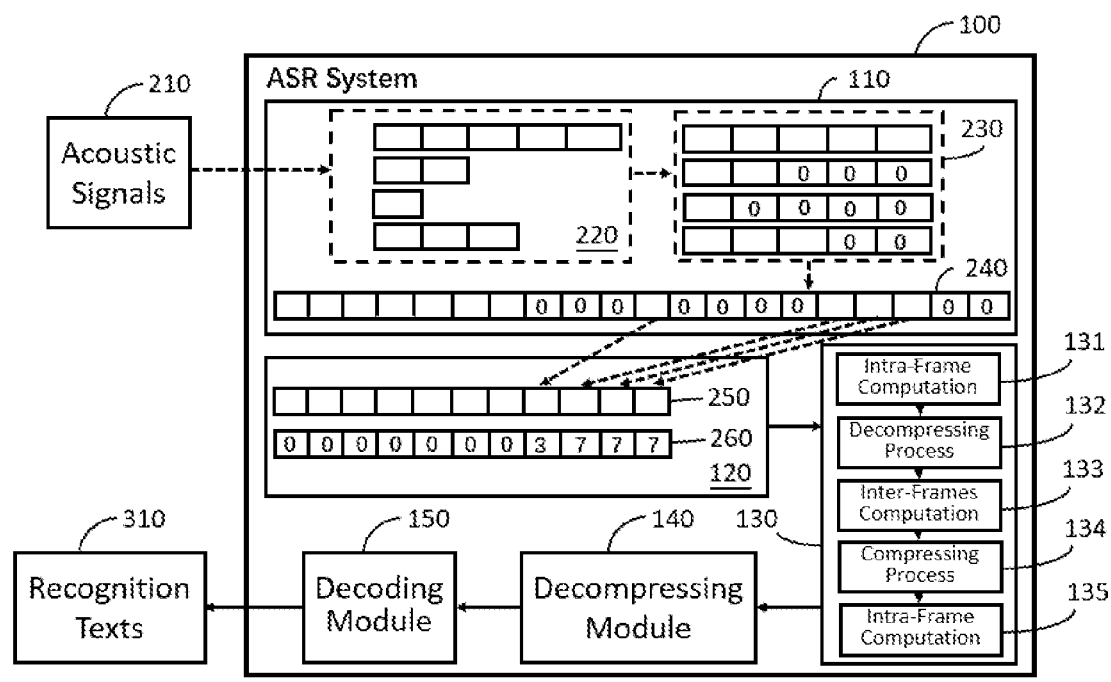
FIG. 5 is a block diagram illustrating an exemplary automatic speech recognition system that includes exemplary sequences together with an offset mask matrix, according to some embodiments of the present disclosure.

FIG. 5 is a block diagram illustrating an exemplary automatic speech recognition system that includes exemplary sequences together with an offset mask matrix, according to some embodiments of the present disclosure.

As shown in FIG. 5, the ASR system 100 may perform pre-processing module 110 with the obtained acoustic signals 210. In some embodiments, the acoustic signals 210 may have a plurality of first sequences 220 and each of the first sequences 220 may have different lengths. For example, the first sequences 220 are 5, 2, 1, and 3 in lengths respectively as shown in FIG. 5.

Within the pre-processing module 110, after receiving the first sequences 220, the processor may pad (i.e. add) zero frames to each sequence such that all the sequences could have the same lengths. For example, the first sequences 220 may be padded with 3, 4, and 2 zero frames respectively at the end to form second sequences 230, such that all the sequences 230 could have the same 5 frame length. In some embodiments, the length of each of the second sequences 230 is determined based on the longest sequence length in the first sequences 220. In some embodiments, each frame may, but not limited to, be 40 data points, such that each padded zero frame includes 40 zero data points.

All second sequences 230 may then be combined into one padded sequence to be used as input to perform encoder-decoder architecture based speech recognition. Such sequences combining process may, but not limited to, concatenate the second sequences 230 sequentially by nature in memory. For example, after being padded, the second sequences 230 are then been sequentially combined into the padded sequence 240 as shown in FIGS.

Prior to entering the encoder neural network 130, the padded sequence 240 may be compressed by the compressing module 120 by reducing the size of the padded sequence 240 in order to obtain a compressed sequence 250 that has a shorter sequence length than the padded sequence 240. In some embodiments, such reducing process may be implemented by removing previously padded zero frames from the padded sequence 240. As shown in FIG. 5 for example, the compressing module 120 compresses the padded sequence 240 by removing 9 zero frames, which are previously padded by the pre-processing module 110, from the padded sequence 240 to obtain the compressed sequence 250, so that the compressed sequence 250 is 9 frame less long than the padded sequence 240 and thus execution time and memory consumption while performing encoder-decoder architecture based speech recognition can be reduced.

In some embodiments, an offset mask matrix 260 may be generated by the compressing module 120 based on positional information of the removed zero frames for the usage of further decompressing module. In some embodiments, the positional information includes a plurality of prefixed sums calculated based at least in part on the locations of the removed zero frames within the padded sequence 240. As shown in FIG. 5 for example, the frames in the offset mask matrix 260 denoted by the numbers "3" and "7" are the prefixed sums calculated based on accumulated number of the removed zero frames at the corresponding location in the padded sequence 240 respectively.

After that, the compressing module 120 may input the compressed sequence 250 into the encoder neural network 130 to perform encoding to obtain an encoded sequence (not shown). For example, the encoder neural network 130 includes a plurality of encoder kernels sequentially received the compressed sequence 250 and executed on it. Each of the plurality of encoder kernels may include the processes of input embedding, multi-head attention, and feed forward to generate a sequence of representations. The input embedding process maps the compressed sequence 250 into an embedding vector based on a word embedding table, and obtains a positional embedding corresponding to one or more location within the compressed sequence 250, and generates an encoder embedding vector by adding/summing the input embedding and the positional embedding. The multi-head attention processes may jointly attend to information from different sequence of representations at different location. The process of feed forward may send the sequence of representations to other encoder kernels for further encoding.

Each encoder kernel may include a plurality of stacked encoder layers. Some encoder layers of the plurality of encoder layers may be fused into one single sub-kernel of the encoder kernel. When many of these encoder layers are fused into one or more sub-kernels, computation cost and memory access cost are accordingly reduced. Each encoder kernel may include the one or more sub-kernels. The one or more sub-kernels of the encoder kernel may be implemented by a single compute unified device architecture (CUDA) kernel that can be directly run on the encoder neural network 130.

The encoder kernels may include a plurality of computations. Such computations may be categorized into intra-frame computations and inter-frames computations. The intra-frame computations take place within the frames, while the inter-frames computations take place between frames. That is, when computations are performed, the intra-frame computations only need to compute the data within this frame, while the inter-frames computations need to involve the data of this frame and also the data of other frames, such as its adjacent frames. In some embodiments, the intra-frame computations may include computations of feed-forward network (FFN), activation, normalization, and query-key-value (QKV) linear, residual, softmax, and elementwise operations. In some embodiments, the inter-frames computations may include computations of self-attention and convolution.

The computations within the encoder kernels may be categorized into intra-frame computations and inter-frames computations (e.g. a first intra-frame computation 131, a second intra-frame computation 135, and an inter-frames computation 133 as shown in FIG. 5). The compressed sequence 250 may be used to perform the first intra-frame computation 131 and then be decompressed by a decompressing process 132 to obtain a decompressed sequence prior to the inter-frames computation 133 by recovering the compressed sequence 250 to an original sequential ordering. In some embodiments, such recovering process may be implemented by restoring the zero frames, which are previously removed by the compressing module 120, to the compressed sequence 250. The inter-frames computation 133 then uses the decompressed sequence as input to perform its computation. The first intra-frame computation 131, the second intra-frame computation 135, and the inter-frames computation 133 described herein may each include one or more computations.

To further reduce the execution time and the memory consumption, the decompressed sequence may optionally be reduced its size again through the compressing process 134 prior to being used in the second intra-frame computations 135 as shown in FIG. 5. Although the decompressing process 132 and the compressing process 134 described herein are each performed only once in FIG. 5, the encoder neural network 130 is capable of performing the decompressing process 132 and compressing process 134 multiple times, corresponding to each switch between intra-frame and inter-frames computation depending on the embodiment.

In some embodiments, whether to perform the compressing process 134 may be based on an efficiency gain. Such efficiency gain may be evaluated based at least in part on the following aspects: (1) throughput, i.e., how many sequences are processed within a second, (2) query per second (QPS), and/or (3) latency.

After all the encoder kernels have generated corresponding sequences of representations, the last encoder kernel of the plurality encoder kernels may combine all the sequences of representations and generate the encoded sequence.

As decompressing module 140 in FIG. 5 shows, the encoded sequence may be decompressed by recovering to the original sequential ordering prior to being used in the decoding module 150. In some embodiments, such recovering process may be implemented by restoring the removed zero frames to the encoded sequence based on the positional information recorded in the offset mask matrix 260. In some embodiments, such restoring process may be based at least in part on the prefixed sums of the positional information. For example, when the prefixed sums of the positional information are detected, e.g., the numbers "3" and "7" within the offset mask matrix 260 as shown in FIG. 5, the decompressing module 140 may restore 3 and 4 zero frames to the corresponding location of the encoded sequence, respectively.

After the decompressing module 140, the encoded sequence may be inputted to the decoding module 150 to obtain recognition texts 310. In some embodiments, the decoding module 150 may include a pre-trained decoder neural network and a beam search process. For example, the decoder neural network may include a plurality of decoder kernels that may be sequentially executed. Each of the plurality of decoder kernels may receive the encoded sequence and an output from the previous decoder kernel to generate a current decoder output through processes of input embedding, multi-head self-attention, multi-head cross attention, feed forward, output embedding, and softmax operations.

Figure 6:
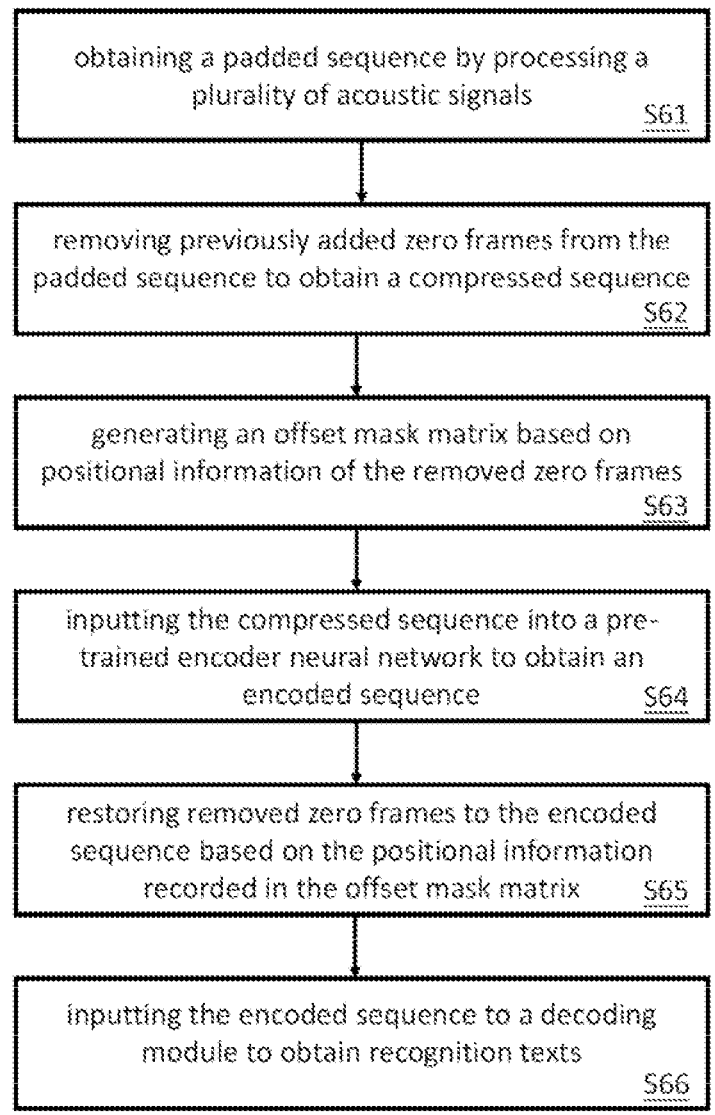
FIG. 6 is a flowchart illustrating some exemplary method steps for implementing automatic speech recognition that includes the offset mask matrix, according to some embodiments of the present disclosure.

FIG. 6 is a flowchart illustrating some exemplary method steps for implementing automatic speech recognition that includes the offset mask matrix, according to some embodiments of the present disclosure.

As shown in FIG. 6, step 61 includes obtaining a padded sequence by processing a plurality of acoustic signals. Next, step 62 includes removing previously added zero frames from the padded sequence to obtain a compressed sequence. Further, step 63 includes generating an offset mask matrix based on positional information of the removed zero frames. Further, step 64 includes inputting the compressed sequence into a pre-trained encoder neural network to obtain an encoded sequence. Further, step 65 includes restoring removed zero frames to the encoded sequence based on the positional information recorded in the offset mask matrix. Further, step 66 includes inputting the encoded sequence to a decoding module to obtain recognition texts.

Figure 7:
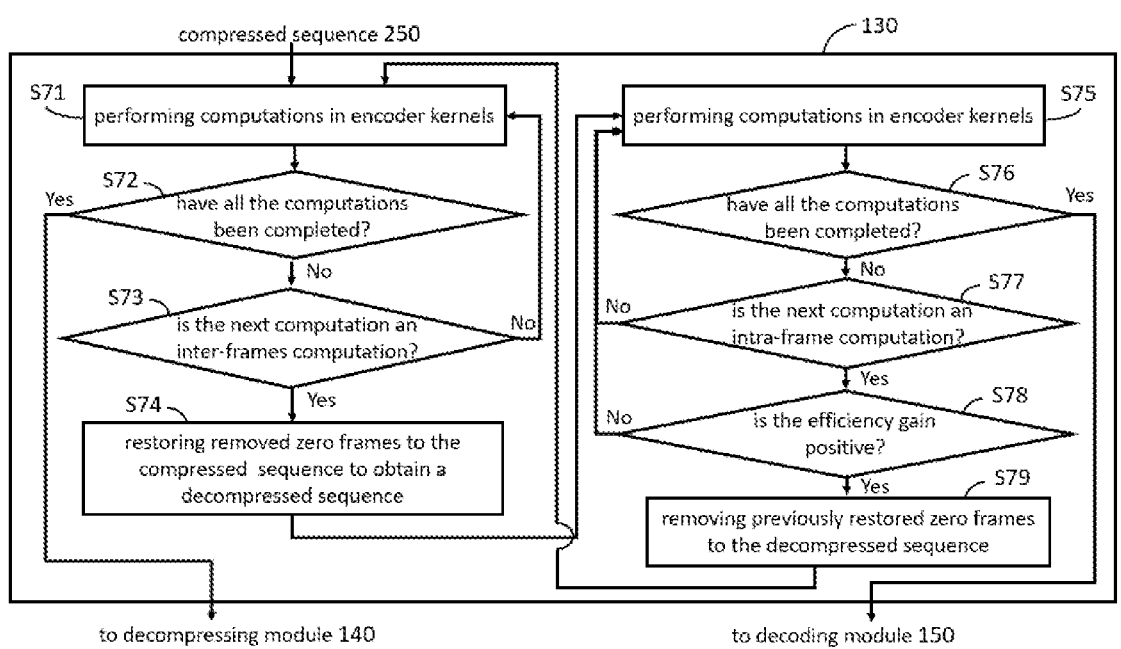
FIG. 7 is a flowchart illustrating some exemplary method steps executed within the encoder neural network for further reducing the execution time and the memory consumption associated with switches between intra-frame and inter-frames computations, according to some embodiments of the present disclosure.

FIG. 7 is a flowchart illustrating some exemplary method steps executed within the encoder neural network 130 for further reducing the execution time and the memory consumption associated with switches between intra-frame and inter-frames computations, according to some embodiments of the present disclosure.

As shown in FIG. 7, step 71 includes performing computations in encoder kernels. For example, such computation is the first intra-frame computation 131 as shown in FIG. 5.

Step 72 includes checking if all the computations of the encoder kernels have been completed. In the positive case, the processor sends the output to the decompressing module 140 as the encoded sequence for further decompressing and then decoding. In the negative case, the method flow leads to step 73.

Step 73 includes checking if the next computation performed in encoder kernels is an inter-frames computation. In the negative case, i.e., the next computation is an intra-frame computation, the encoder neural network 130 may perform the next computation (i.e. return to step S71) and start over again. In the positive case, the encoder neural network 130 may restore the removed zero frames to the compressed sequence (step S74) to generate a decompressed sequence, which may be based on the positional information recorded in the offset mask matrix, and then perform the computation (step S75) with the decompressed sequence.

Step S76 includes checking if all the computations of the encoder kernels have been completed. In the positive case, the processor sends the output to the decoding module 150 as the encoded sequence for further decoding. In the negative case, the method flow leads to step S77.

Step S77 includes checking if the next computation performed in encoder kernels is an intra-frame computation. In the negative case, i.e., the next computation is another inter-frames computation, the encoder neural network 130 may return and repeat step 75 that performs the computation with the decompressed sequence again. In the positive case, the method flow leads to step S78.

Step S78 includes checking if the efficiency gain is positive. In some embodiments, such efficiency gain may be evaluated based on, but not limited to, the following aspects: (1) throughput, i.e., how many sequences are processed within a second, (2) query per second (QPS), and/or (3) latency. In the negative case, i.e., the efficiency gain is negative, the encoder neural network 130 may return and repeat step S75 that performs the computation with the decompressed sequence. In the positive case, the processor may remove previously restored zero frames to the decompressed sequence (step S79) to re-obtain the compressed sequence 250, and then the method flow leads to step S71 again performing the computation with the compressed sequence.

Advantages of compressing the padded sequence (e.g. removing the added zero frames from the padded sequence) prior to the entering encoder neural network or the intra-frame computations thereof are, but not limited to, the execution time and the memory consumption of ASR can be reduced, such that the overall performance of the encoder-decoder network based ASR (e.g. with transformer and conformer models on heterogeneous computing platform) can be accordingly improved. However, in some embodiments, the compressed sequence needs to be decompressed (i.e. to recover to the original sequential ordering) prior to: (1) being used in the inter-frames computation within the encoder neural network, or (2) being used in the decoding module, as described above. Preferably, whether to compress the padded/decompressed sequence is based on the efficiency gain as described above, so that the overall performance improvement is always guaranteed.

Figure 8:
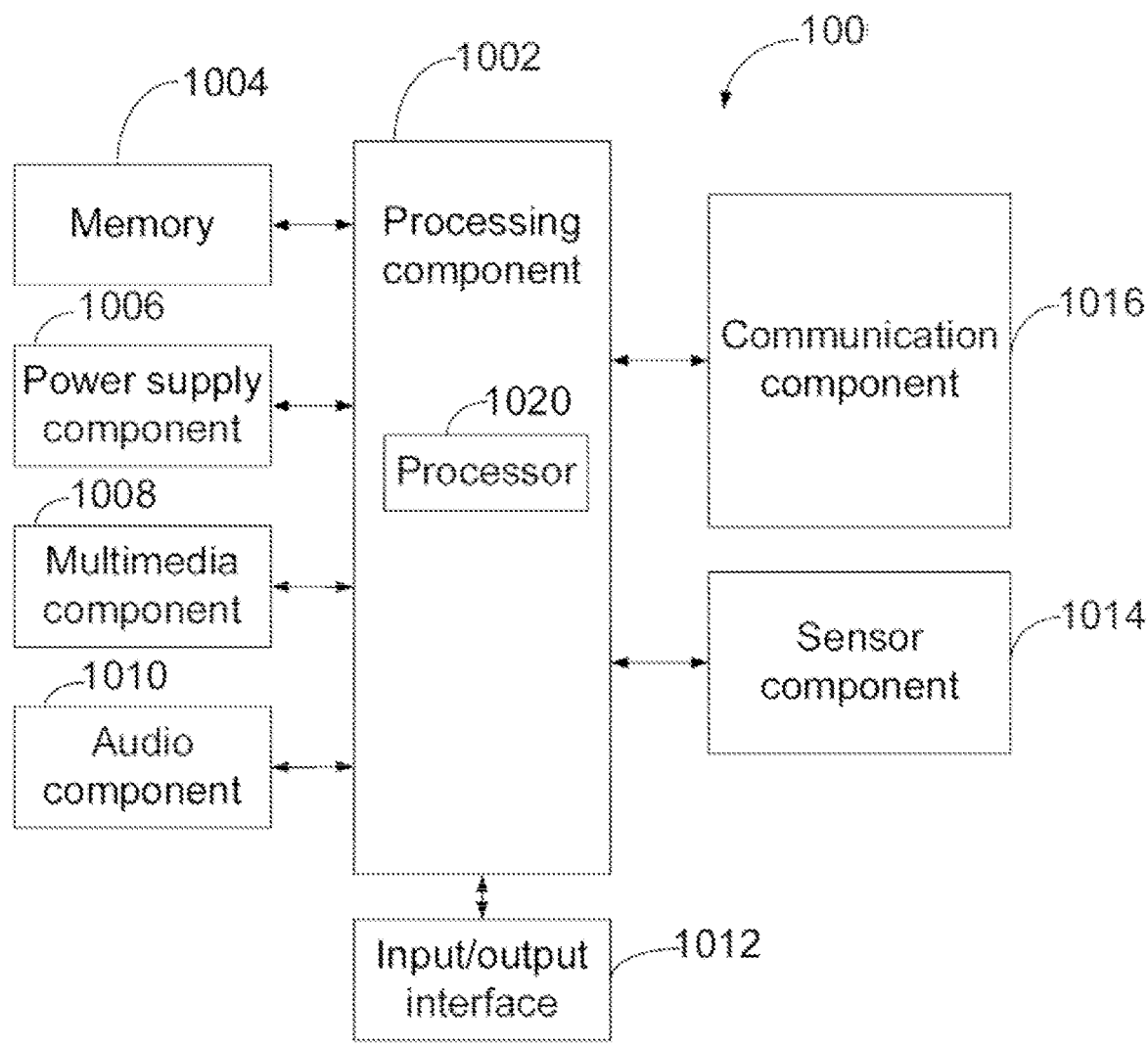
FIG. 8 is a block diagram illustrating an automatic speech recognition system in accordance with some embodiments of the present disclosure.

FIG. 8 is a block diagram illustrating an automatic speech recognition system in accordance with some embodiments of the present disclosure. As shown in FIG. 8, the ASR system 100 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 usually controls overall operations of the ASR system 100, such as operations relating to display, a telephone call, data communication, a camera operation and a recording operation. The processing component 1002 may include one or more processors 1020 for executing instructions to complete all or a part of steps of the above method. Further, the processing component 1002 may include one or more modules to facilitate interaction between the processing component 1002 and other components. For example, the processing component 1002 may include a multimedia module to facilitate the interaction between the multimedia component 1008 and the processing component 1002.

The memory 1004 is configured to store different types of data to support operations of the ASR system 100. Examples of such data include instructions, contact data, phonebook data, messages, pictures, videos, and so on for any application or method that operates on the ASR system 100. The memory 1004 may be implemented by any type of volatile or non-volatile storage devices or a combination thereof, and the memory 1004 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1006 supplies power for different components of the ASR system 100. The power supply component 1006 may include a power supply management system, one or more power supplies, and other components associated with generating, managing and distributing power for the ASR system 100.

The multimedia component 1008 includes a screen providing an output interface between the ASR system 100 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1008 may include a front camera and/or a rear camera. When the ASR system 100 is in an operation mode, such as a shooting mode or a video mode, the front camera and/or the rear camera may receive external multimedia data.

The audio component 1010 is configured to output and/or input an audio signal. For example, the audio component 1010 includes a microphone (MIC). When the ASR system 100 is in an operating mode, such as a call mode, a recording mode and a voice recognition mode, the microphone is configured to receive an external audio signal. The received audio signal may be further stored in the memory 1004 or sent via the communication component 1016. In some examples, the audio component 1010 further includes a speaker for outputting an audio signal.

The I/O interface 1012 provides an interface between the processing component 1002 and a peripheral interface module. The above peripheral interface module may be a keyboard, a click wheel, a button, or the like. These buttons may include but not limited to, a home button, a volume button, a start button and a lock button.

The sensor component 1014 includes one or more sensors for providing a state assessment in different aspects for the ASR system 100. For example, the sensor component 1014 may detect an on/off state of the ASR system 100 and relative locations of components. For example, the components are a display and a keypad of the ASR system 100. The sensor component 1014 may also detect a position change of the ASR system 100 or a component of the ASR system 100, presence or absence of a contact of a user on the ASR system 100, an orientation or acceleration/deceleration of the ASR system 100, and a temperature change of ASR system 100. The sensor component 1014 may include a proximity sensor configured to detect presence of a nearby object without any physical touch. The sensor component 1014 may further include an optical sensor, such as a CMOS or CCD image sensor used in an imaging application. In some examples, the sensor component 1014 may further include an acceleration sensor, a gyroscope sensor, a magnetic sensor, a pressure sensor, or a temperature sensor.

The communication component 1016 is configured to facilitate wired or wireless communication between the ASR system 100 and other devices. For example, the ASR system 100 may access a wireless network based on a communication standard, such as WiFi, 4G, or a combination thereof through the communication component 1016, such as wired or wireless Ethernet network card. For another example, the communication component 1016 receives a broadcast signal or broadcast related information from an external broadcast management system via a broadcast channel. For another example, the communication component 1016 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the ASR system 100 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

The acoustic signals 210 as described herein may come from one or more above mentioned components, such as the audio component 1010, the sensor component 1014, and/or the communication component 1016. The recognition texts 310 as described herein may output to one or more above mentioned components, such as the multimedia component 1008, the communication component 1016, and/or the memory 1004. For example, the audio component 1010, such as a microphone, may transmit the acoustic signals 210 to the ASR system 100 for speech recognition, and then the multimedia component 1008, such as a screen, may receive and display the recognition texts 310 from the ASR system after the speech recognition is complete. For another example, the communication component 1016, such as an Ethernet network card, may receive the acoustic signals 210 from the Internet and then transmit to the ASR system 100 for speech recognition. Once the speech recognition is complete, the ASR system 100 may send the recognition texts 310 back to the Internet through the communication component 1016.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for automatic speech recognition, comprising:
   obtaining a padded sequence by processing a plurality of acoustic signals associate with a speech input;
   compressing the padded sequence by reducing a size of the padded sequence to obtain a compressed sequence;
   inputting the compressed sequence into a pre-trained encoder neural network to obtain an encoded sequence;
   decompressing the encoded sequence by recovering the encoded sequence to an original sequential ordering to obtain a decompressed sequence prior to an inter-frames computation performed within the pre-trained encoder neural network, wherein the inter-frames computation takes place between frames; and
   inputting the encoded sequence that is decompressed to a decoding module and generating recognition texts as an output from the decoding module.

2. The method of claim 1, wherein reducing the size of the padded sequence comprises removing previously added zero frames from the padded sequence.

3. The method of claim 2, wherein recovering the encoded sequence to the original sequential ordering comprises restoring removed zero frames to the encoded sequence.

4. The method of claim 2, further comprising:
   generating an offset mask matrix based on positional information of the removed zero frames.

5. The method of claim 4, wherein recovered the encoded sequence to the original sequential ordering comprises restoring the removed zero frames to the encoded sequence according to the offset mask matrix.

6. The method of claim 4, wherein the positional information comprises a plurality of prefixed sums calculated based on the locations of the removed zero frames within the padded sequence.

7. The method of claim 1, further comprising:
   compressing the decompressed sequences by reducing the size of the decompressed sequence prior to an intra-frame computation performed within the pre-trained encoder network, wherein the intra-frame computation takes place within the frames.

8. The method of claim 2, further comprising:
   evaluating an efficiency gain prior to an intra-frame computation performed within the pre-trained encoder network, wherein the intra-frame computation takes place within the frames; and
   compressing the encoding sequences based on the evaluated efficiency gain by removing padded empty frames.

9. The method of claim 8, wherein the efficiency gain is evaluated based on a throughput value, a query-per-second (QPS) value, or a latency value.

10. An automatic speech recognition system for recognizing speech, comprising:
    at least one computer storage memory operable to store data along with computer-executable instructions; and
    at least one processor operable to read the data and operate the computer-executable instructions to:
    obtaining a padded sequence by processing a plurality of acoustic signals associate with a speech input;
    compressing the padded sequence by reducing a size of the padded sequence to obtain a compressed sequence;
    inputting the compressed sequence into a pre-trained encoder neural network to obtain an encoded sequence;

decompressing the encoded sequence by recovering the encoded sequence to an original sequential ordering to obtain a decompressed sequence prior to an inter-frames computation performed within the pre-trained encoder neural network, wherein the inter-frames computation takes place between frames; and inputting the encoded sequence that is decompressed to a decoding module and generating recognition texts as an output from the decoding module.

11. The automatic speech recognition system of claim 10, wherein reducing the size of the padded sequence comprises removing previously added zero frames from the padded sequence.

12. The automatic speech recognition system of claim 11, wherein recovering the encoded sequence to the original sequential ordering comprises restoring removed zero frames to the encoded sequence.

13. The automatic speech recognition system of claim 11, wherein the at least one processor is further configured to:
generating an offset mask matrix based on positional information of the removed zero frames.

14. The automatic speech recognition system of claim 13, wherein recovered the encoded sequence to the original sequential ordering comprises restoring the removed zero frames to the encoded sequence according to the offset mask matrix.

15. The automatic speech recognition system of claim 13, wherein the positional information comprises a plurality of prefixed sums calculated based on the positions of the removed zero frames within the padded sequence.

16. The automatic speech recognition system of claim 10, wherein the at least one processor is further configured to:
compressing the decompressed sequences by reducing the size of the encoded sequence prior to an intra-frame computation performed within the pre-trained encoder network, wherein the intra-frame computation takes place within the frames.

17. The automatic speech recognition system of claim 11, wherein the at least one processor is further configured to:
evaluating an efficiency gain prior to an intra-frame computation performed within the pre-trained encoder network, wherein the intra-frame computation takes place within the frames; and compressing the encoding sequences based on the evaluated efficiency gain by removing padded empty frames.

18. The automatic speech recognition system of claim 17, wherein the efficiency gain is evaluated based on a throughput value, a query-per-second (QPS) value, or a latency value.

19. A non-transitory computer readable medium having stored thereon a program for performing a method of automatic speech recognition, the method comprising:
obtaining, by at least one processor, a padded sequence by processing a plurality of acoustic signals associate with a speech input;

compressing, by the at least one processor, the padded sequence by reducing a size of the padded sequence to obtain a compressed sequence;

encoding, by a pre-trained encoder neural network by the at least one processor, the compressed sequence to obtain an encoded sequence;

decompressing, by the at least one processor, the encoded sequence by recovering the encoded sequence to an original sequential ordering to obtain a decompressed sequence prior to an inter-frames computation performed within the pre-trained encoder neural network, wherein the inter-frames computation takes place between frames; and decoding, by a decoding module in the at least one processor, the encoded sequence that is decompressed; and generating, by the decoding module, recognition texts as an output of the decoding module.

* * * * *